(12) United States Patent
Ito et al.

(10) Patent No.: US 7,616,822 B2
(45) Date of Patent: Nov. 10, 2009

(54) IMAGE CODING APPARATUS AND IMAGE CODING METHOD

(75) Inventors: Naoki Ito, Tokyo (JP); Hirokazu Tamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 703 days.

(21) Appl. No.: 11/242,033

(22) Filed: Oct. 4, 2005

(65) Prior Publication Data

US 2006/0072163 A1 Apr. 6, 2006

(30) Foreign Application Priority Data

Oct. 6, 2004 (JP) ............................... 2004-294270

(51) Int. Cl.
*G06K 9/36* (2006.01)
*G06K 9/46* (2006.01)

(52) U.S. Cl. ...................................... 382/239
(58) Field of Classification Search ........................ None
See application file for complete search history.

(56) References Cited

U.S. PATENT DOCUMENTS

| | | | | |
|---|---|---|---|---|
| 5,659,631 A | * | 8/1997 | Gormish et al. | 382/166 |
| 6,023,301 A | * | 2/2000 | Katata et al. | 348/586 |
| 6,101,282 A | * | 8/2000 | Hirabayashi et al. | 382/246 |
| 6,301,391 B1 | * | 10/2001 | Nomizu | 382/236 |
| 7,106,911 B2 | | 9/2006 | Ohta et al. | 382/251 |
| 7,158,683 B2 | * | 1/2007 | Yokose | 382/245 |
| 7,194,140 B2 | | 3/2007 | Ito et al. | 382/251 |
| 7,227,998 B2 | | 6/2007 | Nakayama et al. | 382/232 |
| 7,257,264 B2 | | 8/2007 | Nakayama et al. | 382/239 |
| 7,308,150 B2 | * | 12/2007 | Yokose | 382/245 |
| 7,424,163 B1 | * | 9/2008 | Ellis et al. | 382/244 |
| 2003/0043905 A1 | * | 3/2003 | Nakayama et al. | 375/240.04 |
| 2004/0114809 A1 | * | 6/2004 | Kim | 382/232 |
| 2006/0023957 A1 | | 2/2006 | Ito | 382/232 |
| 2006/0045362 A1 | | 3/2006 | Ito et al. | 382/232 |
| 2006/0050975 A1 | | 3/2006 | Ito et al. | 382/232 |
| 2006/0056713 A1 | | 3/2006 | Ito et al. | 382/232 |
| 2006/0104528 A1 | | 5/2006 | Tamura et al. | 382/239 |
| 2007/0206867 A1 | | 9/2007 | Tamura et al. | 382/232 |
| 2008/0037882 A1 | | 2/2008 | Tamura et al. | 382/232 |

* cited by examiner

*Primary Examiner*—Yuzhen Ge
(74) *Attorney, Agent, or Firm*—Fitzpatrick, Cella, Harper & Scinto

(57) ABSTRACT

An attribute data transform unit (205) rearranges a bit string which forms attribute information, using descending order data, and sends the rearranged attribute information to an image/attribute data coding unit (206). The image/attribute data coding unit (206) codes the received attribute information.

7 Claims, 10 Drawing Sheets

| bit7 | bit6 | bit5 | bit4 | bit3 | bit2 | bit1 | bit0 |
|---|---|---|---|---|---|---|---|
| EDGE | TEXT / BACKGROUND | PHOTO | PDL / SCAN | VECTOR | OBJECT | PROCESS A | ACHROMATIC COLOR |

| Index No. | bit7 | bit6 | bit5 | bit4 | bit3 | bit2 | bit1 | bit0 |
|---|---|---|---|---|---|---|---|---|
| 0 | EDGE | TEXT/PHOTO | HALFTONE DOT | PDL/SCAN | VECTOR | OBJECT | PROCESS A | ACHROMATIC COLOR |
| 1 | PDL/SCAN | PROCESS A | OBJECT | HALFTONE DOT | VECTOR | EDGE | TEXT/PHOTO | ACHROMATIC COLOR |
| ....... | | | | | | | | |

IMAGE CODING APPARATUS AND IMAGE CODING METHOD

FIELD OF THE INVENTION

The present invention relates to a technique of coding attribute information of an image.

BACKGROUND OF THE INVENTION

Conventionally, compression of information representing the attribute of each pixel which forms an image, i.e., so-called attribute information uses lossless coding so as not to change the attribute information. However, the compression ratio of lossless coding changes depending on the contents of data to be coded (in this case, attribute information).

When attribute information including a lot of information (attribute information formed from multiple bits) is coded, if a bit value at the same position is referred to, the appearance frequency of the same bit value is low. Hence, it has been difficult to obtain a desired coding efficiency by only simple predictive coding.

SUMMARY OF THE INVENTION

The present invention has been made to overcome the conventional drawbacks, and has as its object to provide a technique of coding attribute information formed from multiple bits while decreasing a code amount to be generated.

In order to achieve an object of the present invention, for example, an image coding apparatus of the present invention comprises the following arrangement.

That is, an image coding apparatus comprises:

holding means for holding position information which is created in advance on the basis of an attribute represented by each bit that forms attribute information and which represents a rearranging position of each bit;

input means for inputting attribute information to be coded;

rearranging means for rearranging a bit string which forms attribute information input by the input means on the basis of the position information; and coding means for coding attribute information whose bit string is rearranged by the rearranging means.

In order to achieve an object of the present invention, for example, an image coding method of the present invention comprises the following arrangement.

That is, an image coding method comprises:

a holding step of holding position information which is created in advance on the basis of an attribute represented by each bit that forms attribute information and which represents a rearranging position of each bit;

an input step of inputting attribute information to be coded;

a rearranging step of rearranging a bit string which forms attribute information input in the input step on the basis of the position information; and a coding step of coding attribute information whose bit string is rearranged in the rearranging step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 1:
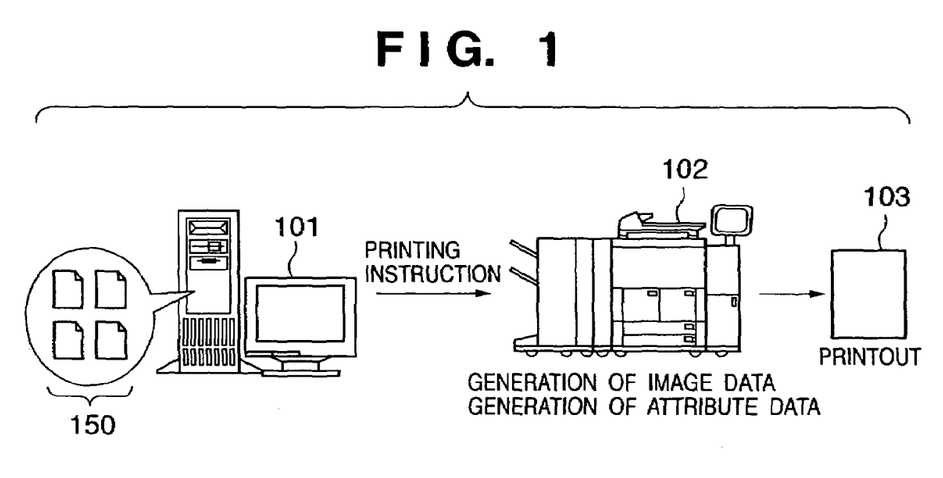
FIG. 1 is a view showing a series of processes in which a computer such as a PC (Personal Computer) or WS (Work Station) causes an apparatus having a printing function to print.

FIG. 1 is a view showing a series of processes in which a computer such as a PC (Personal Computer) or WS (Work Station) causes an apparatus having a printing function to print.

In FIG. 1, reference numeral 101 denotes a computer such as a PC or WS; 102, a multi-functional peripheral as an example of an apparatus having the printing function; and 103, a paper medium (printed product) as a result of printing. Data 150 created by application software or the like is saved in the computer 101. To print the data 150, the computer 101 transmits a printing instruction together with the data 150 to the multi-functional peripheral 102. As is well known, in transmission, data to be printed and printing instruction content data undergo a predetermined conversion process by "driver software of the multi-functional peripheral 102" that is installed in the computer 101, and then are transmitted to the multi-functional peripheral 102.

Upon reception of the data to be printed, the multi-functional peripheral 102 renders the data as an image in the memory, and creates attribute information (attribute data) for each pixel which forms the image. The attribute information represents the attribute of a corresponding pixel, and shows whether a corresponding pixel forms a text or photographic area and whether the pixel has a chromatic or achromatic color. The attribute represented by attribute information is not particularly limited.

The multi-functional peripheral 102 codes the attribute information and rendered image, and temporarily stores them in the memory. The multi-functional peripheral 102 sequentially decodes these data, performs a predetermined image process, and prints on a paper medium on the basis of the processed data, obtaining the printed product 103.

In this way, data transmitted from the computer 101 is printed. Note that the form of inputting data to be printed to the multi-functional peripheral 102 is not limited to the above one. For example, when the scanner function is provided, an image is read by the scanner function. In any case, the multi-functional peripheral 102 performs the above process after inputting an image regardless of the form of inputting an image to the multi-functional peripheral 102.

The multi-functional peripheral 102 will be explained.

Figure 2:
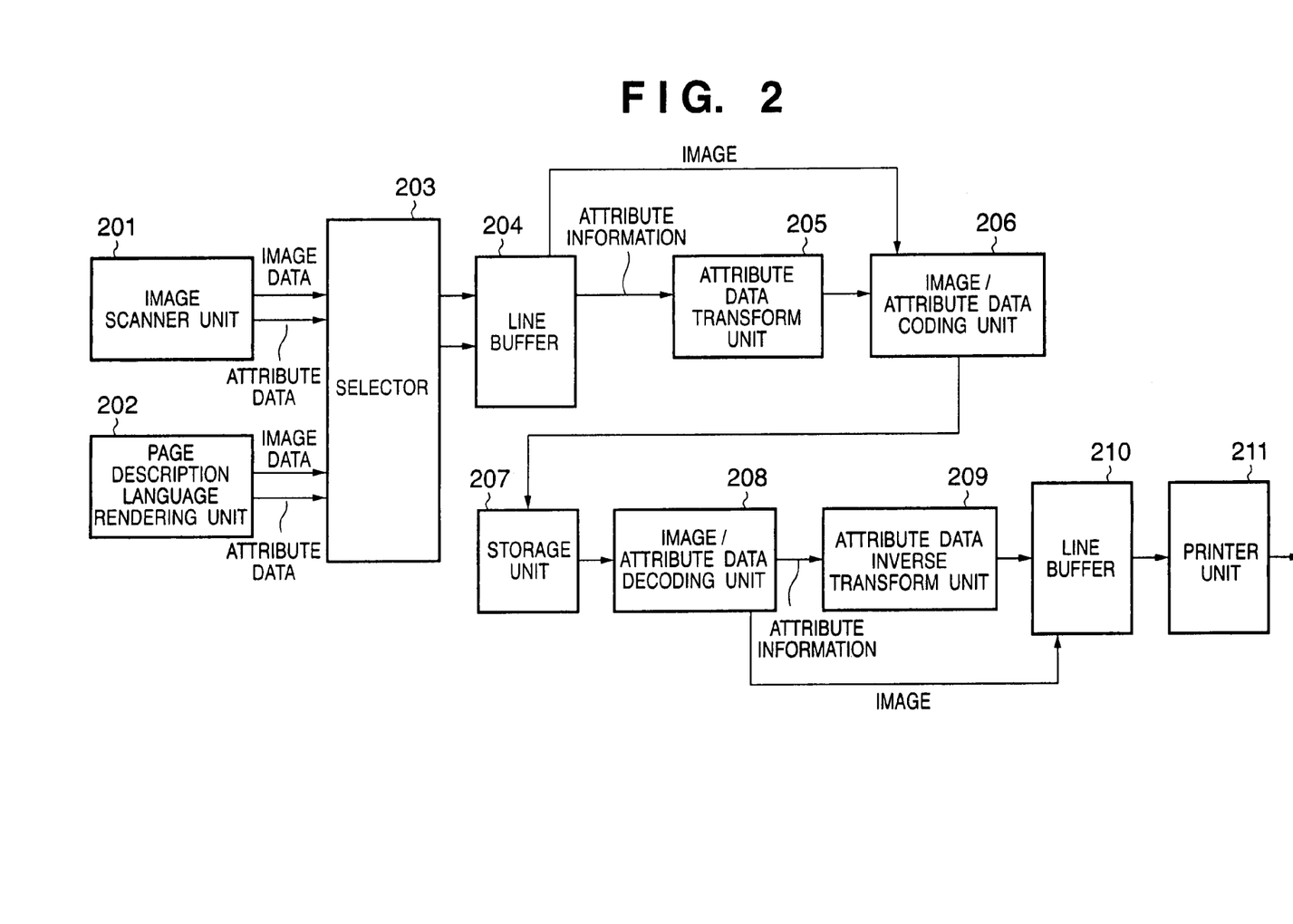
FIG. 2 is a block diagram showing only a part associated with coding of attribute information that is extracted from the functional configuration of a multi-functional peripheral 102.

FIG. 2 is a block diagram showing only a part associated with coding of attribute information that is extracted from the functional configuration of the multi-functional peripheral 102.

An image scanner unit 201 inputs data of an image read from a paper medium or the like by the scan function, and attribute information created for each pixel which forms the image. A page description language rendering unit 202 inputs data of an image rendered on the basis of data transmitted from the computer 101 or the like, and attribute information created for each pixel which forms the image. An attribute data creation process is well known, and a description thereof will be omitted. Image data input from the image scanner unit 201 and image data input from the page description language rendering unit 202 may have different contents of attribute information or different distribution states of the identical information because the methods of creating the image data are different from each other.

The image scanner unit 201 and page description language rendering unit 202 do not simultaneously operate, but only either of them operates. A selector 203 receives image data and attribute data from an active one of the image scanner unit 201 and page description language rendering unit 202, and sends the data to a line buffer 204. Therefore, the multi-functional peripheral 102 can recognize which of the image scanner unit 201 and page description language rendering unit 202 has input image data in process.

An image sent to the line buffer 204 is input to an image/attribute data coding unit 206 and coded in accordance with a coding method such as JPEG. The coded data is stored in a storage unit 207. An image/attribute data decoding unit 208 then sequentially decodes the coded data and sends the data to a line buffer 210.

A coding process for attribute information is executed as follows. The multi-functional peripheral 102 confirms which of the image scanner unit 201 and the page description language rendering unit 202 has input image data in process. After that, the following process is performed on the image data input by a specified input method in advance. That is, an attribute data transform unit 205 reads out each attribute information sent to the line buffer 204, and rearranges a bit string which forms the attribute information.

For example, the attribute information of the image data input from the image scanner unit 201 passes through the attribute data transform unit 205 without changing the order, but the attribute information of the image data input from the page description language rendering unit 202 is rearranged.

Figure 4:
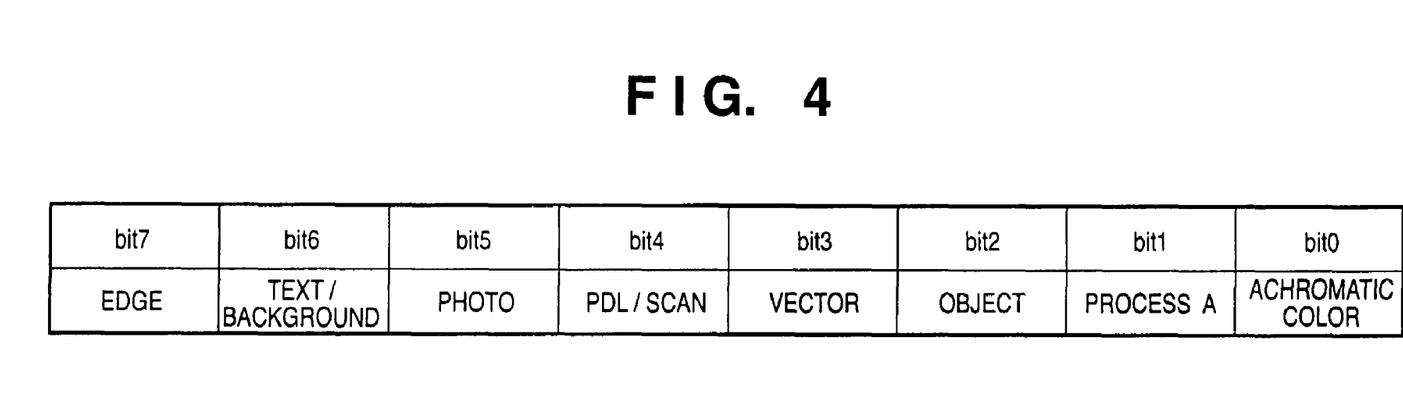
FIG. 4 is a table showing an example of the structure of attribute information.

FIG. 4 is a table showing an example of the structure of attribute information. In FIG. 4, the attribute information is formed from a bit string of 8 bits. For example, the 0th bit (bit 0) represents whether a corresponding pixel has a chromatic or achromatic color: '1' means an achromatic color, and "0" means a chromatic color. The 6th bit (bit 6) represents whether a corresponding pixel forms a text or background area: "1" means a pixel which forms a text area, and "0" means a pixel which forms a background area. The 5th bit (bit 5) represents whether a corresponding pixel forms a photographic area: "1" means a pixel which forms a photographic area. For each bit which forms attribute information, the attribute of a corresponding pixel is recorded with a bit value. In the following description, attribute information has the structure shown in FIG. 4, but is not limited to this structure and can take any structure.

Figure 5:
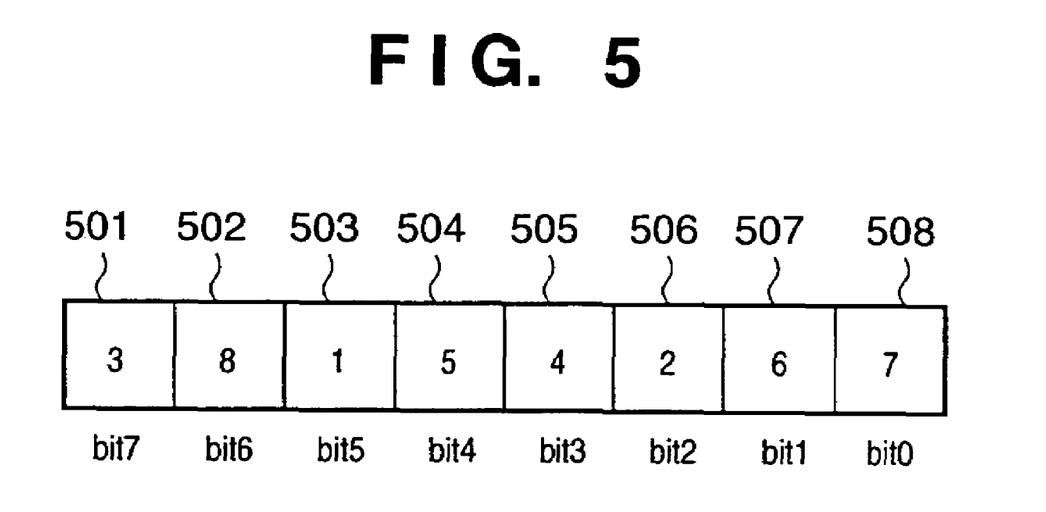
FIG. 5 is a table showing an example of the structure of descending order data.

When image data is input by a predetermined input method (e.g., method for inputting image data from the page description language rendering unit 202), the attribute data transform unit 205 holds descending order data. The descending order data is ordered in descending order of frequency with which a bit value of each bit that forms attribute information changes. FIG. 5 is a table showing an example of the structure of descending order data. It represents the order of frequency with which a bit value at each bit position changes among pieces of attribute information when the attribute information is formed from 8 bits.

Reference numeral 501 denotes an ordinal position of bit 7, which is "3" in FIG. 5. The frequency with which a bit value at bit 7 changes among pieces of attribute information is the 3rd highest in these 8 bits. Reference numeral 502 denotes an ordinal position of bit 6, which is "8" in FIG. 5. The frequency with which a bit value at bit 6 changes among pieces of attribute information is the lowest in these 8 bits. Reference numeral 503 denotes an ordinal position of bit 5, which is "1" in FIG. 5. The frequency with which a bit value at bit 5 changes among pieces of attribute information is the highest in these 8 bits.

Reference numeral 504 denotes an ordinal position of bit 4, which is "5", in FIG. 5. The frequency with which a bit value at bit 4 changes among pieces of attribute information is the 5th highest in these 8 bits. Reference numeral 505 denotes an ordinal position of bit 3, which is "4" in FIG. 5. The frequency with which a bit value at bit 3 changes among pieces of attribute information is the 4th highest in these 8 bits. Reference numeral 506 denotes an ordinal position of bit 2, which is "2" in FIG. 5. The frequency with which a bit value at bit 2 changes among pieces of attribute information is the 2nd highest in these 8 bits.

Reference numeral 507 denotes an ordinal position of bit 1, which is "6" in FIG. 5. The frequency with which a bit value at bit 1 changes among pieces of attribute information is the 6th highest in these 8 bits. Reference numeral 508 denotes an ordinal position of bit 0, which is "7" in FIG. 5. The frequency with which a bit value at bit 0 changes among pieces of attribute information is the 7th highest in these 8 bits.

Figure 10:
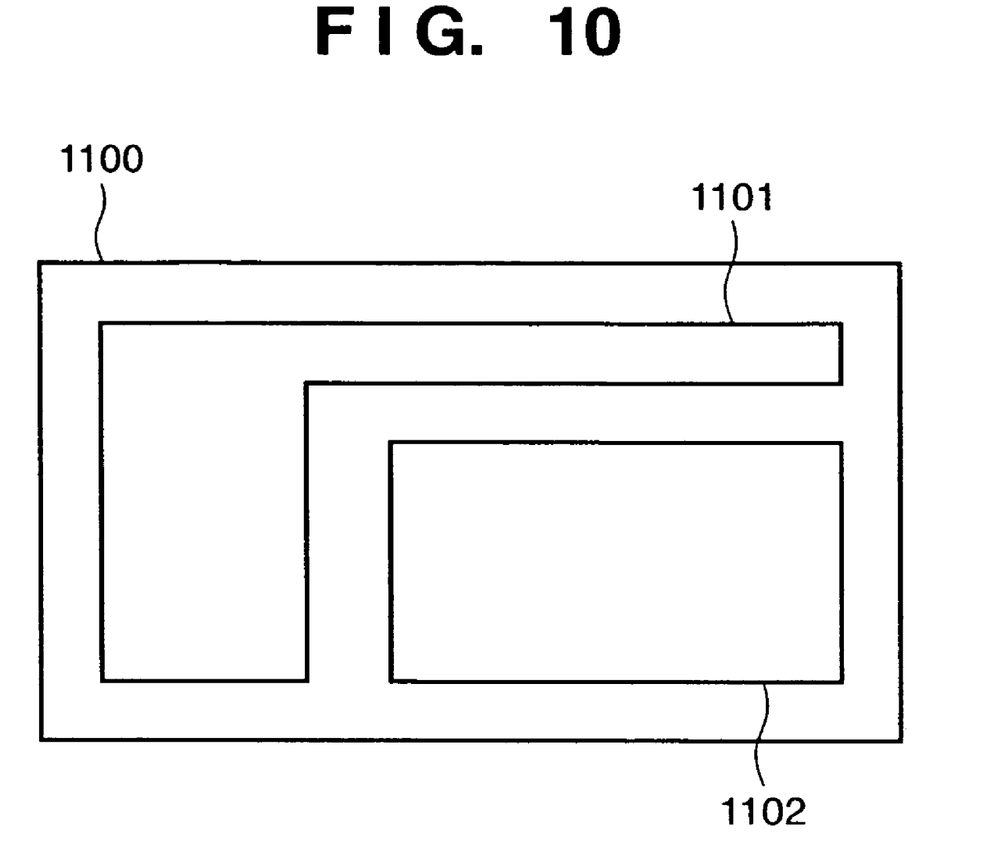
FIG. 10 is a view showing an example of the layout of an image including photographic and text areas.

A change in bit value of attribute information at each bit position will be described by exemplifying image data shown in FIG. 10. FIG. 10 is a view showing an example of the layout of an image including photographic and text areas. In FIG. 10, reference numeral 1100 denotes an entire image; 1101, a text area in which characters are listed; and 1102, an image area in which photos are laid out.

Each pixel within the photographic area 1102 is a pixel which forms a photographic area. Therefore, pieces of attribute information within the photographic area 1102 represent the attribute "photo" consecutive in position. A bit value of a bit which represents the attribute "photo" generally does not change within a given area significantly. Since the bit position which represents "photo" in attribute information is bit 5 in FIG. 4, an ordinal position of bit 5 is "1", i.e., an upper bit position (a bit 7 side) as shown in FIG. 5.

On the other hand, each pixel within the text area 1101 is a pixel which forms a text or background. A pixel next to a pixel which forms a character may not form a character, since a character is generally rendered with a given width (the boldness of a character). Pieces of attribute information represent the attributes "text" consecutive in position at a low possibility. For example, when pixels for one line of the text area 1101 are referred to, pieces of attribute information represent the attributes "text" consecutive in position at a low possibility like in the case where pieces of attribute information of pixels represent the attributes "text", "background", "background", "background", "text", . . . . In general, a bit value of a bit which represents the attribute "text/background" changes frequently. In attribute information, a bit which represents "text/background" is bit 6 in FIG. 4. Therefore, an ordinal position of bit 6 is "8", i.e., a lower bit position as shown in FIG. 5.

In this way, an ordinal position of each bit is predetermined, and the descending order data is created from the predetermined ordinal position.

The descending order data is referred to and the corresponding bits are rearranged. If, for example, the descending order data has the structure shown in FIG. 5, the respective bits (bit 0 to bit 7) which form attribute information are rearranged in accordance with the corresponding ordinal positions. That is, the order of bits which form attribute information will be bit 5, bit 2, bit 7, bit 3, bit 4, bit 1, bit 0 and bit 6. A bit at a bit position where the frequency with which a bit value changes among pieces of attribute information is higher is rearranged at a lower bit position. A bit at a bit position where the frequency with which a bit value changes among pieces of attribute information is lower is rearranged at an upper bit position. The descending order data used above can be position information which represents rearranging positions of bits.

When, for example, such attribute information is coded by a coding method which uses a predictive transform, if a sparse appearance distribution of the same bit value is obtained at each bit position, the code amount is increased in the transform into a predictive error, thereby decreasing the coding efficiency. In order to solve this problem, a bit string which forms attribute information is rearranged as described above to obtain a dense appearance distribution of the same bit value, thereby increasing the coding efficiency.

Figure 7:
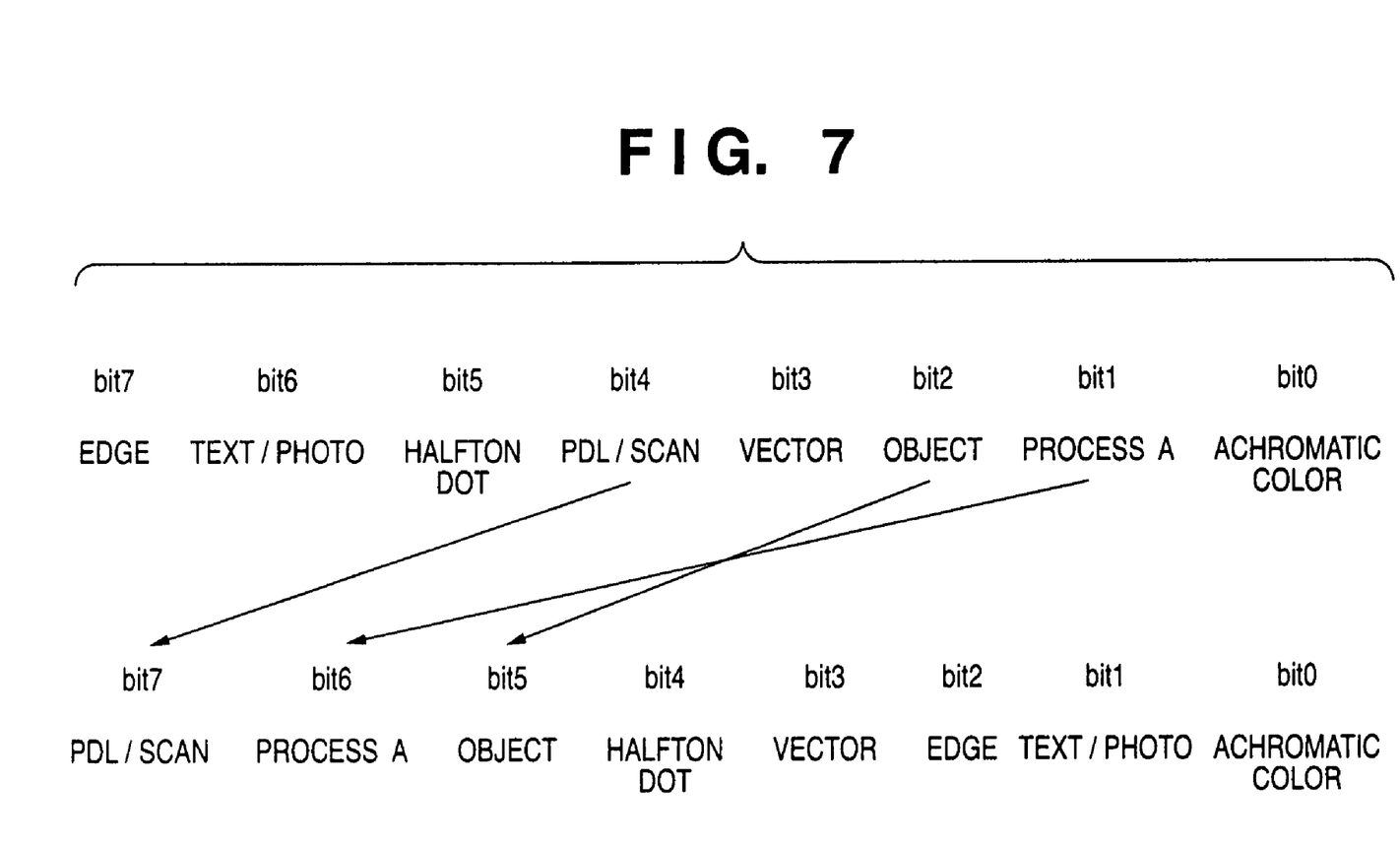
FIG. 7 is a view for explaining a process of rearranging a bit string which forms attribute information.

In the above description, all bits which form attribute information of image data input by a specified input method in advance are rearranged, but the present invention is not limited to this. For example, the positions of only some bits of the attribute information may be rearranged. FIG. 7 is a view for explaining a process of rearranging a bit string which forms attribute information. In FIG. 7, bit 4 is placed at the most significant bit, bit 1 is placed at the 2nd bit from the most significant bit, and bit 2 is placed at the 3rd bit from the most significant bit. In this way, the positions of only some bits may be rearranged. A fewer bits are rearranged, thereby increasing the coding efficiency of attribute information.

The attribute data transform unit 205 sends the bit-rearranged attribute information to the image/attribute data coding unit 206. The image/attribute data coding unit 206 codes the received attribute information. As a coding method, lossless coding such as predictive coding is used.

Note that the image/attribute data coding unit 206 can use lossless coding such as predictive coding which can be adapted to both image and attribute data. In this case, image data is directly sent to the image/attribute data coding unit 206 from the line buffer 204 and then coded. On the other hand, attribute data is coded by the image/attribute data coding unit 206 after the data transform unit 205 rearranges bits of the attribute data.

The coded data of the attribute information is stored in the storage unit 207. Note that the multi-functional peripheral 102 holds flag information which represents whether the coded data of the attribute information is coded after rearranging the bits or coded without rearranging the bits. The flag information is held to be referred to in the subsequent required process steps for each image or each block into which the image is divided. The coded data is read out by the image/attribute data decoding unit 208 in the data storage order. The readout coded data is decoded in an order opposite to that of the coding process executed by the image/attribute data coding unit 206. The image/attribute data decoding unit 208 then sends the decoding result (attribute information) to the attribute data inverse transform unit 209.

With reference to the flag information, the attribute data inverse transform unit 209 executes a process of rearranging bits which form the received attribute information to the original order, i.e., the order set before the attribute data transform unit 205 rearranges the bits, as needed. More specifically, with reference to the descending order data exemplified in FIG. 5 and also held by the attribute data inverse transform unit 209, the 3rd bit from the most significant bit of the attribute information received from the image/attribute data decoding unit 208 is placed at the most significant bit (bit 7); the 8th bit, at the 2nd bit (bit 6); the most significant bit, at the 3rd bit (bit 5); the 5th bit, at the 4th bit (bit 4); the 4th bit, at the 5th bit (bit 3); the 2nd bit, at the 6th bit (bit 2); the 6th bit, at the 7th bit (bit 1); and the 7th bit, at the 8th bit (bit 0). In this way, the attribute data inverse transform unit 209 can rearrange the bit string of the attribute information received from the image/attribute data decoding unit 208, in accordance with the ordinal positions represented by the descending order data, thereby obtaining the original order set before the attribute data transform unit 205 rearranges the bits.

The attribute information rearranged by the attribute data inverse transform unit 209 is sequentially output to the line buffer 210. A printer unit 211 then reads the attribute information output to the line buffer 210. The printer unit 211 executes a process of printing on a medium such as paper using the attribute information on the basis of the print data of the image sent to the line buffer 210. A print data creation process based on an image and a print process using attribute information are well-known, and a description thereof will be omitted.

Figure 6:
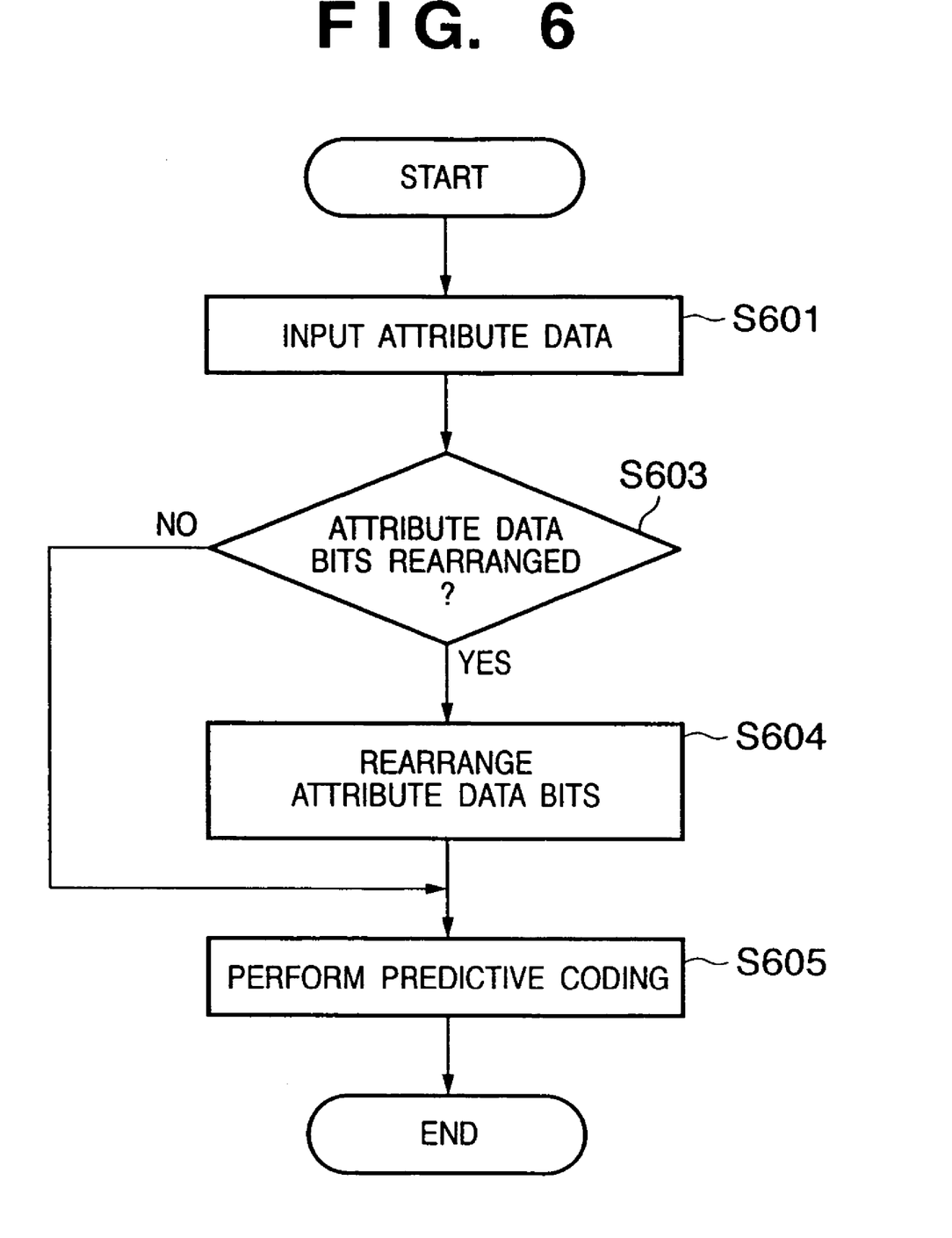
FIG. 6 is a flowchart showing a series of processes associated with coding of one attribute information.

FIG. 6 is a flowchart showing the above-described series of processes associated with coding of one attribute information. When pieces of attribute information are to be coded, the process based on the flowchart of FIG. 6 may be performed for each attribute information. Note that the process in each step has been described in detail above, and will be briefly explained.

The multi-functional peripheral 102 determines whether attribute information of image data is input to the line buffer 204 from the image scanner unit 201 or page description language rendering unit 202. When the attribute information is input to the line buffer 204, the attribute data transform unit 205 reads out the attribute information (step S601). It is determined in accordance with the input method whether the attribute information is rearranged. If necessary, the process advances to step S604 via step S603. In the first embodiment, the attribute information of the image data input from the image scanner unit 201 passes through the attribute data transform unit 205 without rearrangement (the process advances to step S605). The attribute information of the image data input from the page description language rendering unit 202 is rearranged (the process advances to step S604). The attribute data transform unit 205 rearranges a bit string which forms the attribute information using the descending order data (step S604). The attribute data transform unit 205 then sends the rearranged attribute information to the image/ attribute data coding unit 206. The image/attribute data coding unit 206 codes the received attribute information (step S605).

Figure 3:
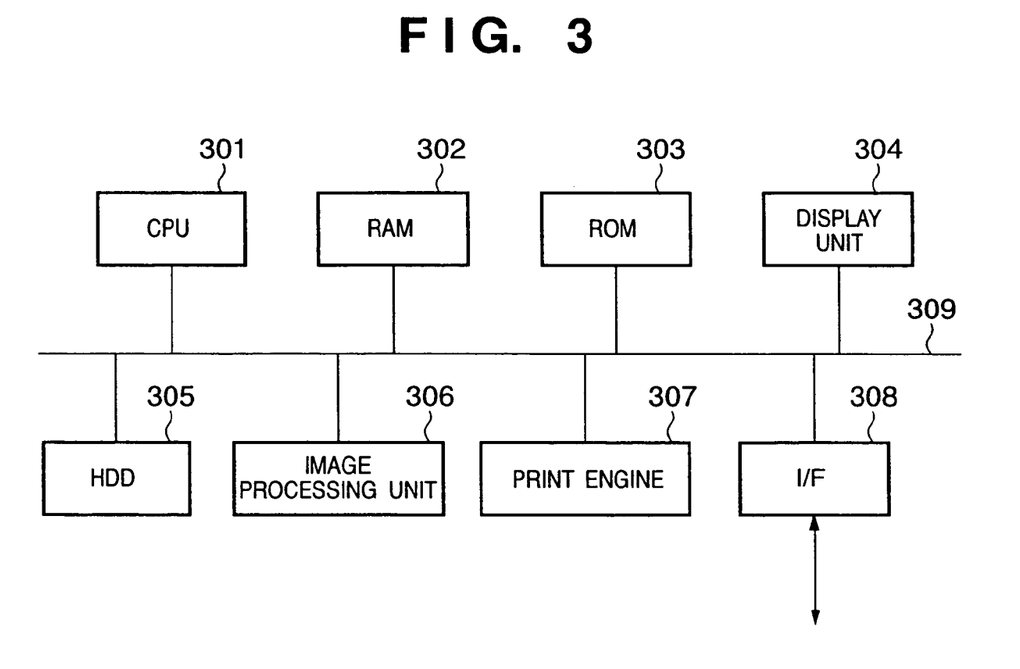
FIG. 3 is a block diagram showing the basic configuration of the multi-functional peripheral 102.

FIG. 3 is a block diagram showing the basic configuration of the multi-functional peripheral 102.

In FIG. 3, reference numeral 301 denotes a CPU which controls the overall multi-functional peripheral 102 by using programs and data that are stored in a RAM 302 and ROM 303, and executes the above-mentioned processes (including the process complying with the flowchart of FIG. 6) to be performed by the multi-functional peripheral 102. The CPU 301 functions as, e.g., the attribute data transform unit 205, image/attribute data coding unit 206, image/attribute data decoding unit 208, and attribute data inverse transform unit 209 in FIG. 2.

The RAM 302 has a work area necessary for the CPU 301 to execute each process, and an area for temporarily storing programs and data which are loaded from an HDD (Hard Disk Drive) 305. The RAM 302 functions as, e.g., the line buffers 204 and 210 in FIG. 2.

The ROM 303 stores programs and data which cause the CPU 301 to control the whole multi-functional peripheral 102, setting data and a boot program of the whole multi-functional peripheral 102, and the like.

Reference numeral 304 denotes a display unit which is formed from, e.g., a touch panel, and displays a current setting state, and button images for inputting various instructions. In the first embodiment, it is determined in accordance with the method for inputting/creating image data whether the attribute information of the image data is rearranged. However, a manual designation factor by the user can also be taken into account. For example, the operator instructs a button image displayed on the display unit 304 and the CPU 301 detects it, thereby adjusting the result of rearrangement which is automatically determined, as the user desires. If the user designates nothing, the multi-functional peripheral 102 automatically determines whether attribute information is rearranged, as described above.

The HDD 305 saves image data input from the scanner unit (not shown) of the multi-functional peripheral 102 or an external computer via an I/F 308. The HDD 305 also saves programs, data, and the like which cause the CPU 301 to execute the above-described processes (including the process complying with the flowchart of FIG. 6) to be performed by the multi-functional peripheral 102. The HDD 305 functions as, e.g., the storage unit 207 in FIG. 2.

Reference numeral 306 denotes an image processing unit which performs a predetermined image process for image data and attribute information, and sends the resultant data to a print engine 307.

As is well known, the print engine 307 prints on a medium such as paper on the basis of data sent from the image processing unit 306. The print engine 307 functions as, e.g., the printer unit 211 in FIG. 2.

The I/F 308 can connect the scanner unit and an external computer (e.g., the computer 101 in FIG. 1), and image data is accepted via the I/F 308.

Reference numeral 309 denotes a bus which connects the above units.

Second Embodiment

In the first embodiment, one descending order data is determined in accordance with the structure of attribute information. In the second embodiment, in order to implement a plurality of rearrangements of bits for one attribute information, a plurality of descending order data representing different orders are prepared.

Figure 9:
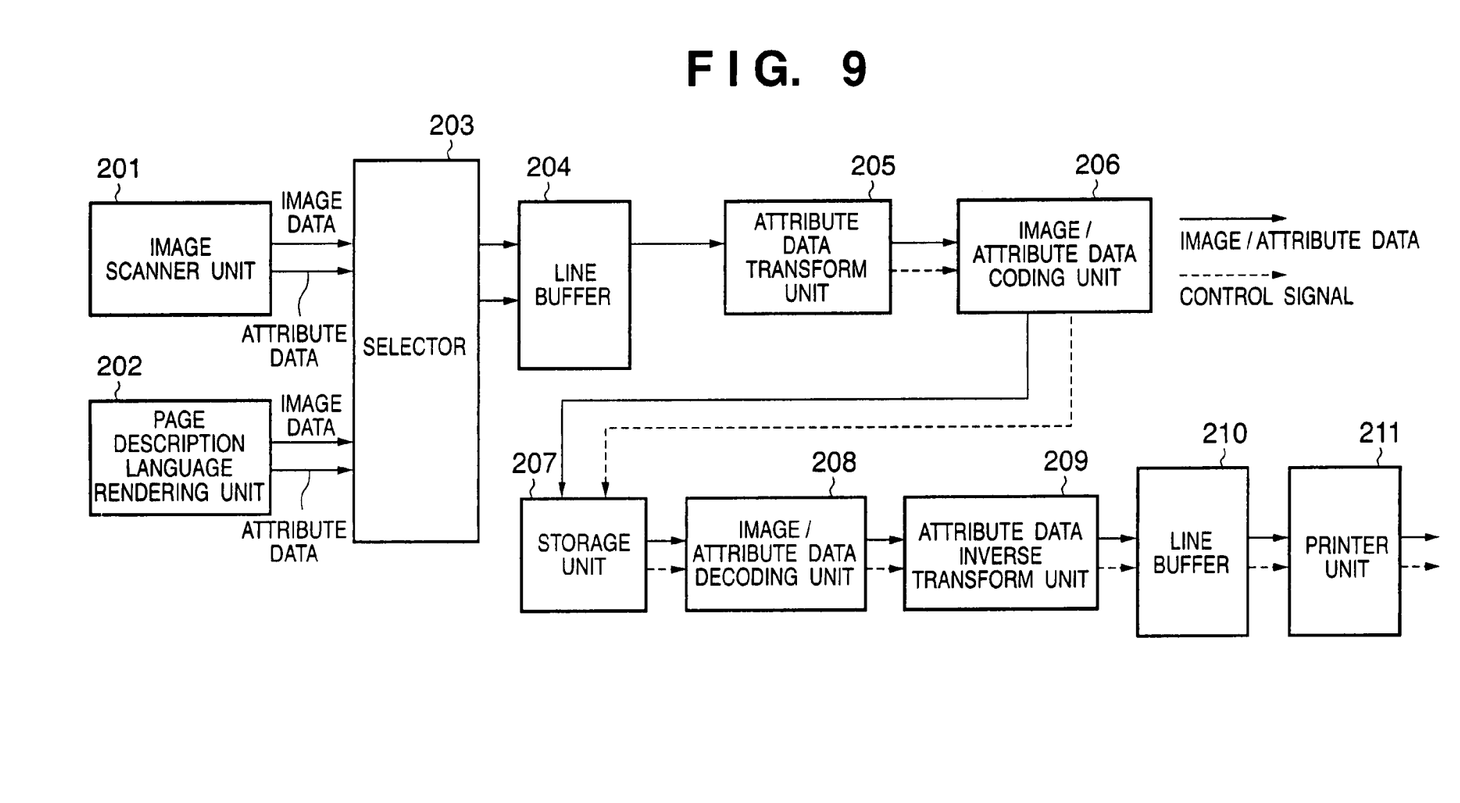
FIG. 9 is a block diagram showing only a part associated with coding of attribute information that is extracted from the functional configuration of the multi-functional peripheral 102.

A multi-functional peripheral 102 according to the second embodiment has the same configuration of the multi-functional peripheral 102 according to the first embodiment as shown in FIG. 9 (the basic configuration is also the same as that in the first embodiment as shown in FIG. 3), except that an attribute data transform unit 205 notifies an attribute data inverse transform unit 209 of a unique ID of descending order data used for rearrangement. The attribute data inverse transform unit 209 can use the descending order data corresponding to the received ID to rearrange a bit string of the attribute information received from an image/attribute data decoding unit 208 to the original order. FIG. 9 is a block diagram showing only a part associated with coding of attribute information that is extracted from the functional configuration of the multi-functional peripheral 102.

Figure 8:
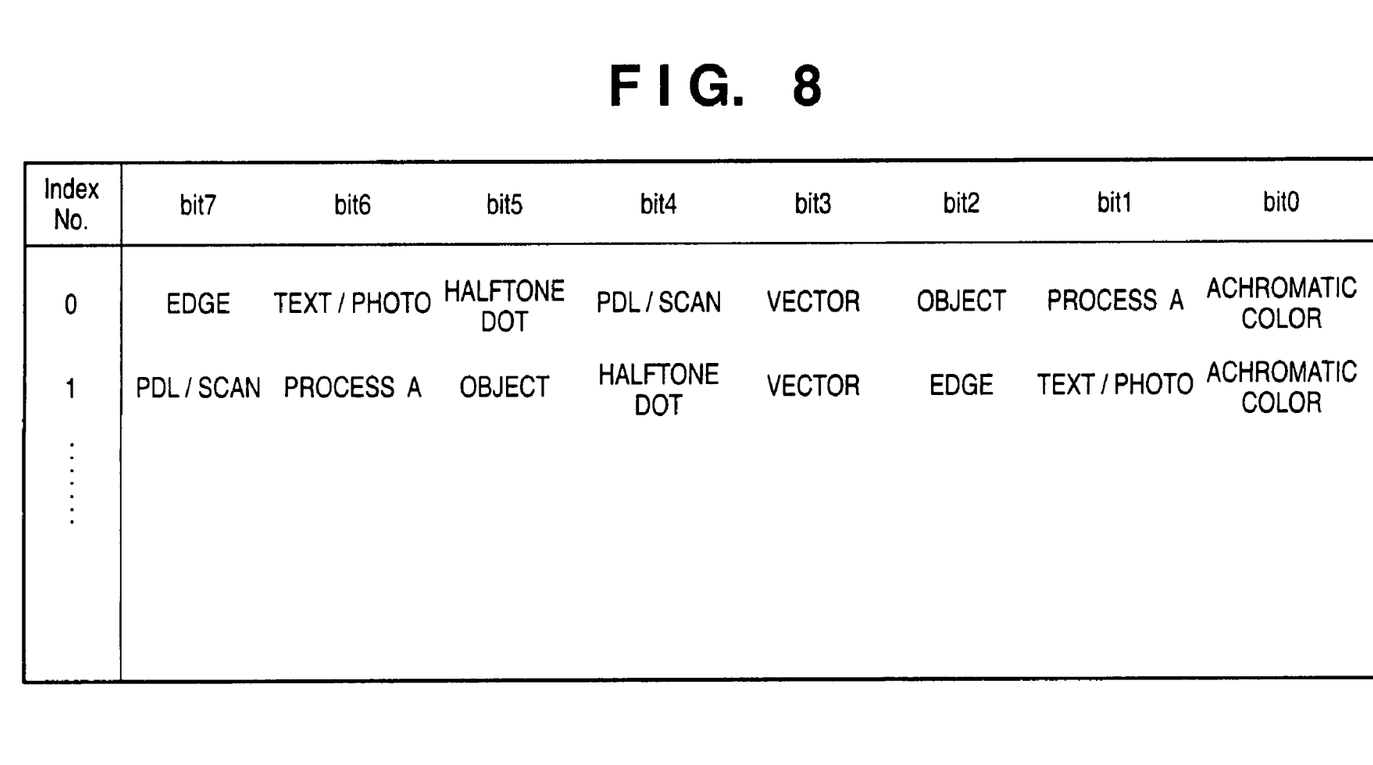
FIG. 8 is a table showing an example of the structure of a table which stores a plurality of descending order data.

FIG. 8 is a table showing an example of the structure of a table which stores a plurality of descending order data. For example, the descending order data having the ID=0 is descending order data for rearranging a bit string of the original attribute information so as to place a bit representing "EDGE" at bit 7; a bit representing "TEXT/PHOTO", at bit 6; a bit representing "HALFTONE DOT", at bit 5; a bit representing "PDL/SCAN", at bit 4; a bit representing "VECTOR", at bit 3; a bit representing "OBJECT", at bit 2; a bit representing "PROCESS A", at bit 1; and a bit representing "ACHROMATIC COLOR", at bit 0.

When the attribute data transform unit 205 notifies the attribute data inverse transform unit 209 of the unique ID of the descending order data used, the attribute data inverse transform unit 209 acquires the descending order data corresponding to the received ID from the table and uses it. Note that data in the table which is used as descending order data by the attribute data transform unit 205 may be set in a setting page displayed on the display screen of the display unit 304. The setting method is not limited to a specific one.

In this way, various rearrangements for attribute information having the same structure can be achieved by storing a plurality of descending order data. In addition, the present invention can be applied to attribute information having different structures or having different lengths of a bit string.

Other Embodiment

The present invention can be implemented as a system, apparatus, method, program, storage medium, or the like. More specifically, the present invention may be applied to a system including a plurality of devices or an apparatus formed by a single device.

The present invention is also achieved by supplying a software program (in the above embodiments, a program corresponding to the flowchart shown in FIG. 6) for implementing the functions of the above-described embodiments to a system or apparatus directly or from a remote place, and reading out and executing the supplied program codes by the computer of the system or apparatus.

The present invention is therefore implemented by program codes installed in the computer in order to implement functional processes of the present invention by the computer. That is, the present invention includes a computer program for implementing functional processes of the present invention.

In this case, the present invention can be implemented as a program such as an object code, a program executed by an interpreter, or script data supplied to an OS as long as a program function is attained.

A recording medium for supplying the program includes a floppy® disk, hard disk, optical disk, magnetooptical disk, MO, CD-ROM, CD-R, CD-RW, magnetic tape, nonvolatile memory card, ROM, and DVD (DVD-ROM and DVD-R).

As another program supply method, the program can be supplied by connecting a client computer to an Internet Web page via the browser of the client computer, and downloading the computer program of the present invention or a compressed file containing an automatic installing function from the Web page to a recording medium such as a hard disk. The program can also be implemented by grouping program codes which form the program of the present invention into a plurality of files, and downloading the files from different Web pages. That is, the present invention also includes a WWW server which allows a plurality of users to download the program files for implementing functional processes of the present invention by a computer.

The program of the present invention can be encrypted, stored in a recording medium such as a CD-ROM, and distributed to the user. A user who satisfies predetermined conditions is prompted to download decryption key information from a Web page via the Internet. The user executes the encrypted program by using the key information, and installs the program in the computer.

The functions of the above-described embodiments are implemented when the computer executes the readout program codes. Also, the functions of the above-described embodiments are implemented when an OS or the like running on the computer performs some or all of actual processes on the basis of the instructions of the program codes.

The functions of the above-described embodiments are implemented when the program read out from the recording medium is written in the memory of a function expansion board inserted into the computer or the memory of a function expansion unit connected to the computer, and the CPU of the function expansion board or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-294270 filed on Oct. 6, 2004, the entire contents of which are hereby incorporated by reference herein.

What is claimed is:

1. An image coding apparatus comprising:
   holding means for holding position information which is created in advance on the basis of an attribute represented by each bit that forms attribute information and which represents a rearranging position of each bit;
   input means for inputting attribute information to be coded;
   rearranging means for rearranging a bit string which forms attribute information input by said input means on the basis of the position information; and
   coding means for coding attribute information whose bit string is rearranged by said rearranging means,
   wherein the position information represents that a bit at a bit position where the frequency with which a bit value changes among pieces of attribute information is higher is rearranged at a lower bit position, and a bit at a bit position where the frequency with which a bit value changes among pieces of attribute information is lower is rearranged at an upper bit position.

2. The apparatus according to claim 1, wherein said coding means performs a predictive coding process on attribute information whose bit string is rearranged by said rearranging means.

3. An image coding apparatus, comprising:
   holding means for holding position information which is created in advance on the basis of an attribute represented by each bit that forms attribute information and which represents a rearranging position of each bit;
   input means for inputting attribute information to be coded;
   rearranging means for rearranging a bit string which forms attribute information input by said input means on the basis of the position information;
   coding means for coding attribute information whose bit string is rearranged by said rearranging means; and
   determination means for determining whether a bit string which forms attribute information input by said input means is rearranged,
   wherein said rearranging means rearranges a bit string which forms attribute information input by said input means, on the basis of the position information in accordance with the result of determination, and
   said coding means codes attribute information whose bit string is rearranged by said rearranging means or attribute information input by said input means.

4. An image coding method comprising:
   a holding step of holding position information which is created in advance on the basis of an attribute represented by each bit that forms attribute information and which represents a rearranging position of each bit;
   an input step of inputting attribute information to be coded;
   a rearranging step of rearranging a bit string which forms attribute information input in the input step on the basis of the position information;
   a coding step of coding attribute information whose bit string is rearranged in the rearranging step; and
   performing all the above steps using at least one processor;
   wherein the position information represents that a bit at a bit position where the frequency with which a bit value changes among pieces of attribute information is higher is rearranged at a lower bit position, and a bit at a bit position where the frequency with which a bit value changes among pieces of attribute information is lower is rearranged at an upper bit position.

5. An image coding method, comprising:
   a holding step of holding position information which is created in advance on the basis of an attribute represented by each bit that forms attribute information and which represents a rearranging position of each bit;
   an input step of inputting attribute information to be coded;
   a rearranging step of rearranging a bit string which forms attribute information input in the input step on the basis of the position information;
   a coding step of coding attribute information whose bit string is rearranged in the rearranging step;
   performing all the above steps using at least one processor; and a determination step of determining whether a bit string which forms attribute information input in the input step is rearranged, wherein in the rearranging step, a bit string which forms attribute information input in the input step is rearranged on the basis of the position information in accordance with the result of determination, and in the coding step, attribute information whose bit string is rearranged in the rearranging step or attribute information input in the input step is coded.

6. A computer readable storage medium storing a program, which when executed by a processor, causes the processor to perform:

a holding step of holding position information which is created in advance on the basis of an attribute represented by each bit that forms attribute information and which represents a rearranging position of each bit;

an input step of inputting attribute information to be coded;

a rearranging step of rearranging a bit string which forms attribute information input in the input step on the basis of the position information; and a coding step of coding attribute information whose bit string is rearranged in the rearranging step, wherein the position information represents that a bit at a bit position where the frequency with which a bit value changes among pieces of attribute information is higher is rearranged at a lower bit position, and a bit at a bit position where the frequency with which a bit value changes among pieces of attribute information is lower is rearranged at an upper bit position.

7. A computer readable storage medium storing a program, which when executed by a processor, causes the processor to perform:

a holding step of holding position information which is created in advance on the basis of an attribute represented by each bit that forms attribute information and which represents a rearranging position of each bit;

an input step of inputting attribute information to be coded;

a rearranging step of rearranging a bit string which forms attribute information input in the input step on the basis of the position information; and a coding step of coding attribute information whose bit string is rearranged in the rearranging step;

a determination step of determining whether a bit string which forms attribute information input in the input step is rearranged, wherein in the rearranging step, a bit string which forms attribute information input in the input step is rearranged on the basis of the position information in accordance with the result of determination, and in the coding step, attribute information whose bit string is rearranged in the rearranging step or attribute information input in the input step is coded.

* * * * *